US 11,888,430 B2

(12) United States Patent
Backman et al.

(10) Patent No.: US 11,888,430 B2
(45) Date of Patent: Jan. 30, 2024

(54) SYSTEM AND METHOD OF INCREASING RESOLUTION OF POSITION FEEDBACK FOR MOTOR CONTROL

(71) Applicant: Magnetek, Inc., Menomonee Falls, WI (US)

(72) Inventors: John A. Backman, Cedarburg, WI (US); Bryan Radke, West Allis, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 173 days.

(21) Appl. No.: 17/322,025

(22) Filed: May 17, 2021

(65) Prior Publication Data

US 2022/0368252 A1  Nov. 17, 2022

(51) Int. Cl.
*B66B 1/30* (2006.01)
*H02P 6/15* (2016.01)

(52) U.S. Cl.
CPC .................. *H02P 6/153* (2016.02)

(58) Field of Classification Search
CPC .................. H02P 6/153; B66B 1/30
USPC .................................... 318/400.14
See application file for complete search history.

(56) References Cited

U.S. PATENT DOCUMENTS

| 6,050,368 A | 4/2000 | Pakarinen et al. |
| 6,051,943 A | 4/2000 | Rabin et al. |
| 7,147,084 B2 | 12/2006 | Jahkonen |
| 7,148,635 B1 * | 12/2006 | Piefer .................. H04L 12/43 318/52 |
| 9,233,815 B2 | 1/2016 | Lee |

(Continued)

FOREIGN PATENT DOCUMENTS

| CN | 1734927 A | 2/2006 |
| EP | 1874669 B1 | 12/2008 |

(Continued)

OTHER PUBLICATIONS

PCT International Search Report dated Aug. 9, 2022; International Application No. PCT/US2022/024627—(3) pages.

(Continued)

*Primary Examiner* — Kawing Chan
*Assistant Examiner* — Gabriel Agared
(74) *Attorney, Agent, or Firm* — Boyle Fredrickson, S.C.

(57) ABSTRACT

A motor drive receives a position feedback signal from an encoder operatively connected to the motor. The motor drive executes a speed regulator module on a first periodic interval to achieve desired operation of the motor, and the motor drive executes an additional module at a second periodic interval, occurring more frequently than the first periodic interval, to increase the resolution of the position feedback. The position feedback signal is provided as or converted to counts. The motor drive maintains a first counter with a running total of each count received as well as a second counter which generates a higher resolution value than the first counter. During each second periodic interval the motor drive increments the high-resolution counter by the number of actual counts detected within the corresponding first periodic interval. This high-resolution counter is used by the speed regulator to obtain desired operation of the motor.

20 Claims, 6 Drawing Sheets

(56) References Cited

U.S. PATENT DOCUMENTS

| | | | |
|---|---|---|---|
| 2006/0267529 A1* | 11/2006 | Piefer | G05B 19/232 |
| | | | 318/432 |
| 2008/0113697 A1 | 5/2008 | Rommerdahl et al. | |
| 2013/0093372 A1* | 4/2013 | Thyagarajan | H02P 21/18 |
| | | | 318/400.04 |
| 2013/0334993 A1* | 12/2013 | Jang | H02P 6/17 |
| | | | 318/400.04 |
| 2015/0015170 A1* | 1/2015 | Backman | H02P 6/16 |
| | | | 318/400.07 |
| 2016/0233813 A1 | 8/2016 | Dalvi et al. | |
| 2018/0016115 A1 | 1/2018 | Ginsberg et al. | |

FOREIGN PATENT DOCUMENTS

| | | |
|---|---|---|
| JP | 04-317986 A | 11/1992 |
| JP | 2018-034925 A | 3/2018 |

OTHER PUBLICATIONS

International Preliminary Report on Patentability for Application No. PCT/US2022/024627 dated Nov. 21, 2023 (4 pages).

\* cited by examiner

SYSTEM AND METHOD OF INCREASING RESOLUTION OF POSITION FEEDBACK FOR MOTOR CONTROL

BACKGROUND INFORMATION

The subject matter disclosed herein relates to a system and method for increasing resolution of a position feedback signal for motor control. More specifically, a motor drive is configured to integrate a position feedback signal between counts during low speed operation to obtain increased resolution of an angular position of the motor when few counts are being received.

As is known to those skilled in the art, motor drives are commonly used to control operation of an Alternating Current (AC) motor. The motor drive is configured to convert a DC voltage, present on a DC bus within the motor drive, to an AC voltage to achieve desired operation of the motor. The AC voltage may have a varying amplitude, frequency, or combination thereof, to provide a desired speed and/or torque within the motor. The AC voltage is supplied to a stator of the motor generating a current through the stator. The current, in turn, establishes an electromagnetic field which rotates about the stator as a function of the frequency of the AC voltage being provided to the stator. The rotating electromagnetic field interacts with a magnetic field in the rotor of the motor to cause rotation of the rotor.

The electromagnetic field in the rotor may be obtained in numerous methods, depending on the type of AC motor to which the motor drive is connected. A synchronous motor may include slip rings by which a separate voltage may be provided to a winding in the rotor. The voltage provided to the winding establishes an electromagnetic field in the rotor to interact with the electromagnetic field in the stator. An induction motor includes a winding in the rotor in which a voltage is induced as a result of the rotating electromagnetic field in the stator. The induced voltage, in turn, establishes an electromagnetic field in the rotor to interact with the electromagnetic field in the stator. A permanent magnet motor includes magnets mounted on a surface of, or embedded within, the rotor of the motor. The magnetic fields generated by the permanent magnets interact with the electromagnetic field in the stator.

The windings and/or magnets in the rotor are typically provided in pairs, where each winding or magnet defines a pole of the motor and one pair of windings or one pair of magnets defines a pole-pair of the motor. A pair of windings are arranged to conduct in alternating directions, thereby generating opposing electromagnetic fields. A pair of magnets are arranged such that one magnet has a north pole and the other magnet has a south pole facing the stator winding. Multiple poles may be positioned around the rotor of the motor, where synchronous and induction motors commonly have lower pole counts, such as two, four, or six poles. Permanent magnet motors may have similar pole counts, but may also have higher pole counts, ranging up to 40-50 or even greater numbers of poles. As is understood in the art, the speed of rotation in the rotor is a function of both the frequency of the AC voltage applied to the stator and the number of poles present in the motor. As the number of poles increases, the speed of the rotor decreases. A slow speed rotor is particularly useful in a direct-drive application, where the rotor may be coupled directly to a driven member rather than requiring a gearbox positioned between the rotor of the motor and the driven member.

One application of a direct-drive permanent magnet motor is in an elevator. The rotor includes a sheave mounted on or integrally formed around the exterior of the rotor. The elevator ropes are wound over grooves on the sheave. An elevator cab is connected at one end of the ropes and a counter-weight is connected at the other end of the ropes. Rotation of the motor causes the ropes to move in the direction of the rotation which, in turn, raises and lowers the elevator cab. During operation of the elevator, it is desirable to provide a smooth ride for occupants of the cab. The motor begins motion at a slow speed and follows smooth acceleration profile up to a top speed. As the elevator cab approaches a desired floor, the motor follows a smooth deceleration profile back down to the slow speed and finally to a stop as the elevator cab arrives at the desired floor.

Obtaining smooth operation at slow speed operation of a direct-drive permanent magnet motor is not without certain challenges. As previously indicated, desired operation of the permanent magnet motor is obtained by supplying an AC voltage to the stator to interact with the magnetic field generated by the permanent magnets. One cycle of the AC voltage, however, will interact with one pole-pair of the motor. When the pole count is low, such as a two-pole motor, a single cycle of AC voltage applied to the stator will result in a full revolution of the motor. When the pole count is high, such as with a forty-pole motor, a single electrical cycle of AC voltage applied to the stator will result in the rotor turning just one-twentieth of a revolution, or eighteen degrees. In order to achieve smooth operation of the motor, the electrical angle must be known with respect to the physical angle. To obtain knowledge of the electrical angle to one degree resolution for the afore-mentioned forty-pole motor, an encoder must generate at least seven thousand two hundred pulses per revolution (7200 ppr) or three hundred sixty degrees multiplied by twenty pole pairs. While this resolution is still marginal, some installations attempt to utilize encoders with lower resolution, such as, two thousand forty-eight pulses per revolution (2048 ppr) or four thousand ninety-six pulses per revolution (4096 ppr). With this lower resolution, the electrical angle may not be determined with sufficient resolution to provide smooth operation of the direct-drive permanent magnet motor.

Thus, it would be desirable to provide a system and method for increasing the resolution of position feedback for improved control of the motor with a low-resolution encoder.

Even when an application provides an encoder having sufficient resolution to determine the electrical angle, the direct-drive permanent magnet motor may be rotating at such a slow speed, that the feedback circuit detects few counts per periodic interval. A typical motor controller may read the number of counts received from an encoder at a two millisecond (2 ms) interval. When a direct-drive permanent magnet motor is rotating slowly (for example, when an elevator application is either approaching or leaving a floor), the number of counts detected within the two millisecond interval may be in the single digits. If the motor is supposed to be running at a constant speed as it approaches the landing, a single count variation between cycles will be at least a ten percent (10% error) in the velocity feedback. The motor controller will respond to the sudden variation in counts with a torque perturbation that, in turn, causes vibration in the system as the motor controller attempts to maintain the same number of counts per interval.

Thus, it would be desirable to provide a system and method increasing the resolution of position and/or velocity feedback for improved control of the motor during slow speed operation.

BRIEF DESCRIPTION

The present invention provides a system and method for increasing the resolution of position and/or velocity feedback for improved control of the motor with a low-resolution encoder and for improved control during slow speed operation of a direct-drive permanent magnet motor. A motor drive receives a position feedback signal from an encoder operatively connected to the motor. The motor drive executes a speed regulator module on a first periodic interval to achieve desired operation of the motor. The speed regulator receives a speed reference signal and a speed feedback signal to determine an error in the actual motor speed from a commanded motor speed. A controller uses the speed error to output a torque or current reference used by the motor drive to adjust the operating speed of the motor to obtain the desired operating speed.

The motor drive includes an additional module executing at a second periodic interval. It is contemplated that the additional module may be an already existing module such as a module configured to regulate the current output to the motor according to the torque or current reference output from the speed regulator. Optionally, a dedicated module may be established to execute at this second interval. The second periodic interval executes at a faster rate than the first periodic interval, and the motor drive utilizes this second periodic interval to increase the resolution of the position feedback.

The position feedback signal may be, for example, a sinusoidal waveform having either a single waveform or a pair of waveforms in quadrature. Optionally, the position feedback signal may be digital pulses having, for example, an A channel and a B channel in quadrature. Either the encoder or the motor drive may be configured to convert the position feedback signal into counts, where a count may be generated, for example, on a positive-to-negative transition in the feedback signal, a negative-to-positive transition in the feedback signal, or on both transitions. Within the second periodic interval, the motor drive is configured to detect each count and maintain a counter with a running total of each count received. Under traditional control, the number of counts would be used directly by the speed regulator to control operation of the motor. However, with a low-resolution encoder or during slow speed operation of a high pole count motor, the number of counts received during each first periodic interval, within which the speed regulator operates, may be less than ten. The small number of counts may result in torque vibration in the motor.

To improve the resolution of the feedback signal the motor drive is configured to maintain a second counter which generates a higher resolution value than the first counter in which the actual number of counts is maintained. The second counter may be reset to zero upon the start of each first periodic interval. Optionally, a value of the high-resolution counter may be captured at the start of each first periodic interval and the value of the high-resolution counter at the end of each first periodic interval may be compared to the value captured at the start to determine a change in value of the high-resolution counter during each first periodic interval. During each second periodic interval, which occurs multiple times within each first periodic interval, the motor drive is configured to increment the high-resolution counter. However, rather than incrementing the counter only upon the detection of a new count, the high-resolution counter is incremented during every second periodic interval. In addition, the amount by which the high-resolution counter is incremented corresponds to the number of actual counts detected up to that point within the corresponding first periodic interval. Thus, if one count has been detected within a given first periodic interval, the high-resolution counter is incremented by one as each second periodic interval executes. After a second count has been detected within the same first periodic interval, the high-resolution counter is then incremented by two, and so on. Operation of the high-resolution counter will be discussed in more detail below.

According to one embodiment of the invention, a method for increasing resolution of a position feedback signal to a motor drive is disclosed. A position feedback signal is received at an input to the motor drive and sampled at a first time interval. A pulse counter within the motor drive is incremented during the first time interval when a new pulse from the position feedback signal is detected. A value of the pulse counter is added to a high resolution pulse count register during each of the first time intervals, and a speed regulator is executed with a processor in the motor drive during a second time interval. The speed regulator uses the high resolution pulse count register, and the second time interval is longer than the first time interval.

According to one aspect of the invention, the step of executing the speed regulator may include receiving a speed reference, converting the high resolution pulse count register to a speed feedback signal, and determining a speed error as a difference between the speed reference and the speed feedback signal.

According to other aspects of the invention, the high resolution pulse count register may be reset during each second time interval. Optionally, a present value of the high resolution pulse count register may be stored in a memory of the motor drive during each second time interval, and the present value of the high resolution pulse count register compared to a stored value from an immediately prior second time interval to determine a number of high resolution pulses between consecutive second time intervals. The number of high resolution pulses between the consecutive second time intervals in the speed regulator may then be used in the speed regulator.

According to still other aspects of the invention, the steps performed during the first time interval may be executed at least ten times between performing the steps during the second time interval. The pulses from the position feedback signal may be converted to counts, such that the step of sampling the position feedback signal comprises sampling a number of counts received and the step of incrementing the pulse counter occurs when a new count from the position feedback signal is detected.

According to another embodiment of the invention, a motor drive configured to increase resolution of a position feedback signal includes an input configured to receive a position feedback signal and a processor. The processor is configured to execute a first series of instructions at a first time interval and to execute a second series of instructions at a second time interval, where the first time interval is shorter than the second time interval. The first series of instructions increments a first counter when a new pulse from the position feedback signal is detected and adds a value of the first counter to a high resolution counter during each first time interval. The second series of instructions executes a position regulator using the high resolution counter during each second time interval.

According to another aspect of the invention, the processor may be further configured to execute the second series of instructions to convert the high resolution counter to a speed feedback signal and to determine a speed error as a difference between a speed reference and the speed feedback signal. The processor may also be configured to execute the second series of instructions to reset the high resolution counter during each second time interval. The processor may also be configured to execute the second series of instructions to store a present value of the high resolution counter in a memory of the motor drive during each second time interval and to compare the present value of the high resolution counter to a stored value from an immediately prior second time interval to determine a number of high resolution pulses between consecutive second time intervals. The number of high resolution pulses between the consecutive second time intervals may be used in the speed regulator.

According to yet another aspect of the invention, the motor drive is configured to convert pulses from the position feedback signal to counts, and the processor is further configured to execute the first series of instructions to increment the first counter when a new count from the position feedback signal is detected.

According to still another embodiment of the invention, a method for increasing resolution of a position feedback signal to a motor drive includes receiving a position feedback signal at an input to the motor drive, determining a number of counts in the motor drive as a function of the position feedback signal, monitoring the number of counts at a first time interval, incrementing a first counter within the motor drive during the first time interval when a new count is detected, adding a value of the first counter to a high resolution counter during each of the first time intervals, and executing a speed regulator in the motor drive during a second time interval. The speed regulator uses the high resolution counter, and the second time interval is longer than the first time interval.

According to other aspects of the invention, the motor drive includes a feedback circuit configured to receive the position feedback signal and to determine the number of counts. Optionally, the motor drive includes a feedback circuit configured to receive the position feedback signal and a processor configured to determine the number of counts.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 1:
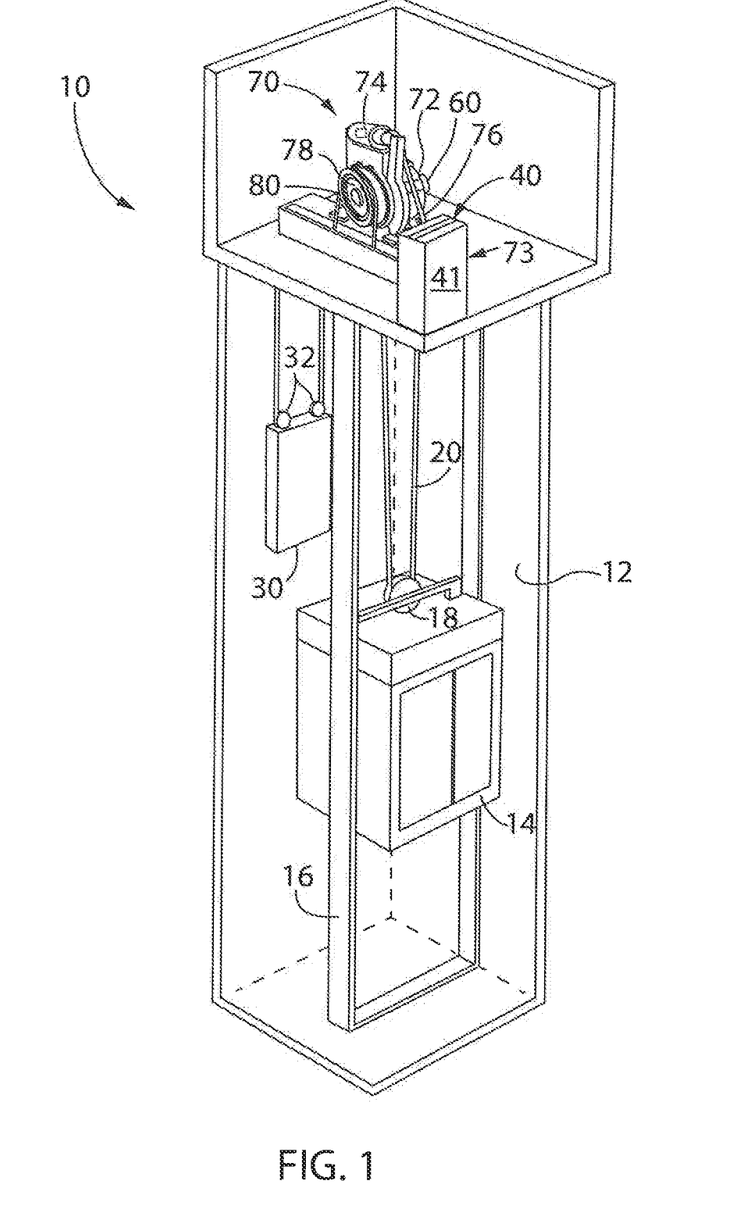
FIG. 1 is an exemplary counterbalancing system implemented by an elevator and a counterweight in which the system provides an electrical motor, a brake, an encoder and a controller for implementing a smooth brake to drive transition in accordance with an embodiment of the invention.

Turning initially to FIG. 1, an exemplary counterbalancing system, as shown in the exemplary elevator system 10, is provided in accordance with an embodiment of the invention. A shaft 12 includes a cab 14 configured to move up and down the shaft 12. The cab 14 includes, for example, wheels configured to engage rails 16 extending vertically along each side of the shaft 12 to maintain horizontal alignment of the cab 14 within the shaft 12. Cables 20 extending around one or more cab sheaves 18 (a grooved spindle or pulley) mounted to the top of the cab 14 may be used to raise or lower the cab 14 within the shaft 12. According to the illustrated embodiment, a first end of the cables 20 are fixedly mounted to a first point at the top of the shaft 12 and routed down and around the cab sheave 18 mounted to the top of the cab 14. The cables 20 are then routed over one or more drive sheaves 78 mounted to an electrical motor 70. The cables 20 continue around one or more counterweight sheaves 32 mounted to a counterweight 30 and back to a second point at the top of the shaft 12. It is contemplated that various other configurations of cables, sheaves, and cable routing may be utilized according to the application requirements without deviating from the scope of the invention.

According to the illustrated embodiment, the motor 70 may be mounted in a machine room located above the elevator shaft 12. Optionally, the motor 70 may be mounted in the elevator shaft 12. A brake 60, is operatively connected to the motor 70 to provide braking in the system, and an encoder 80 is operatively connected to the motor 70 to provide a feedback signal corresponding to an angular position of the motor 70. According to the illustrated embodiment, a control cabinet 41 is provided in the machine room. The control cabinet 41 may include a motor drive 40 to control operation of the motor and a separate controller 73 providing instructions to the motor drive 40. A junction box 74 may be mounted to the top of a housing 72 of the motor 70, and electrical conductors 76 may run between the control cabinet 41 and the junction box 74, the motor 70, the brake 60, and the encoder 80 to connect the motor drive 40 and the controller 73 with the motor, brake, and encoder. The electrical conductors 76 conduct electrical power and control signals to or feedback signals from the motor 70, the brake 60 and encoder 80 as will be further described.

Figure 2:
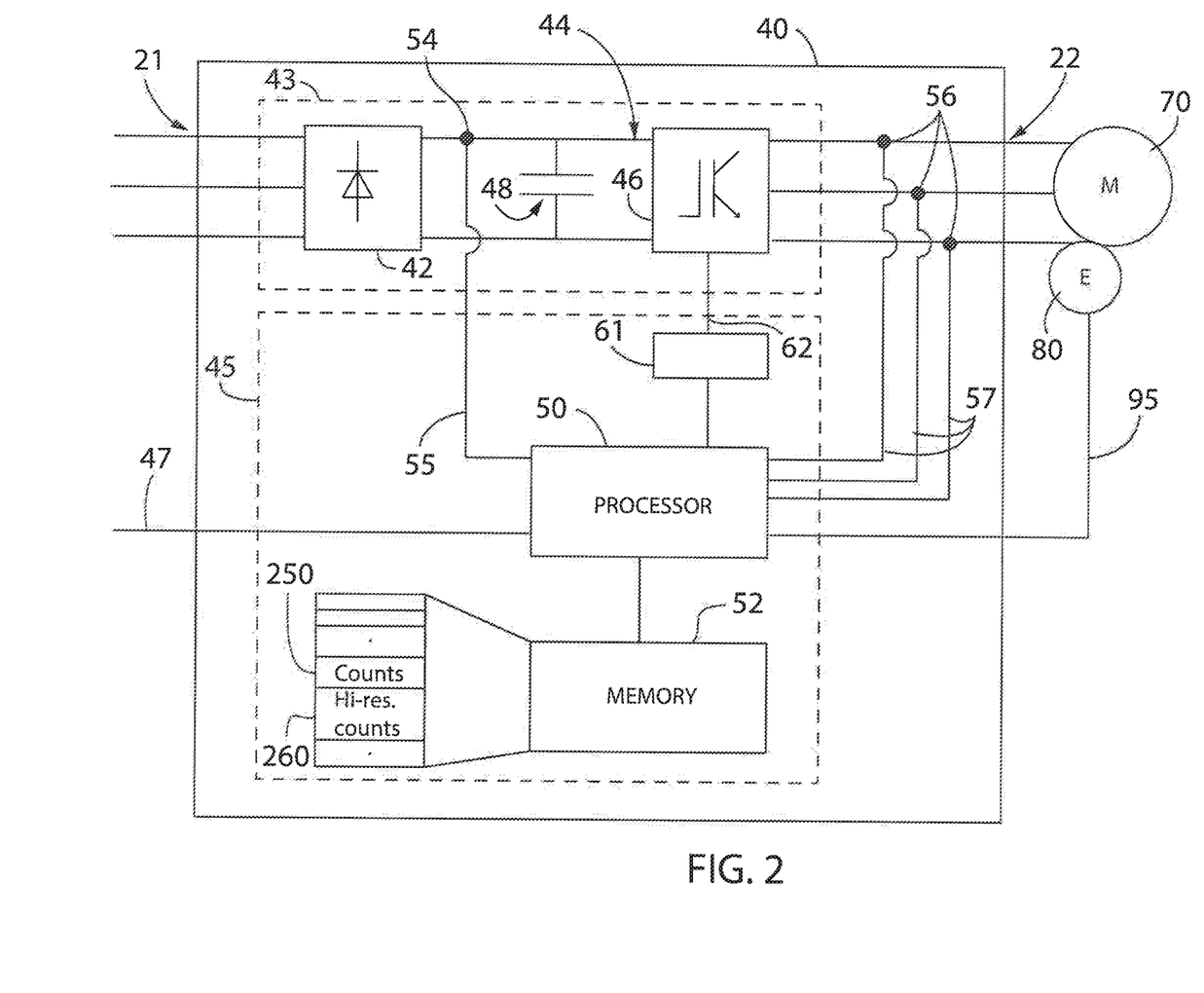
FIG. 2 is a block diagram representation of one embodiment of a motor controller and motor incorporated into the elevator system of FIG. 1.

Referring also to FIG. 2, the motor drive 40 includes a power conversion section 43 and a control section 45. The power conversion section 43 converts the input power 21 to the desired voltage at the output 22. According to the illustrated embodiment, the power conversion section 43 includes a rectifier section 42 and an inverter section 46, converting a fixed AC input 21 to a variable amplitude and variable frequency AC output 22. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The rectifier section 42 converts the AC voltage input 21 to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single capacitor, or multiple capacitors, arranged in serial, parallel, or a combination thereof according to the power ratings of the motor drive 40. An inverter section 46 converts the DC voltage on the DC bus 44 to the desired voltage at the output 22 for the motor 70 according to switching signals 62.

The control section 45 receives a command signal 47 and feedback signals and generates the switching signals 62 responsive to the command and feedback signals to achieve desired operation of the motor 70. The control section 45 includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single electronic device, or multiple electronic devices, including static memory, dynamic memory, transitory memory, non-transitory memory, or a combination thereof. The memory device 52 preferably stores parameters of the motor drive 40 and one or more programs, which include instructions executable on the processor 50. A parameter table may include an identifier and a value for each of the parameters. The parameters may, for example, configure operation of the motor drive 40 or store data for later use by the motor drive 40.

A motor control module may be stored in the memory 52 for execution by the processor 50 to control operation of the motor 70. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor drive 40 respectively. The processor 50 also receives a position feedback signal 95 from the position sensor 80, such as an encoder or resolver, mounted to the motor 70. The switching signals 62 may be determined by an application specific integrated circuit 61 receiving reference signals from a processor 50 or, optionally, directly by the processor 50 executing the stored instructions. The switching signals 62 are generated, for example, as a function of the feedback signals, 55, 57, and 95, received at the processor 50.

The controller 73 in the control cabinet 41 may similarly include a processor and a memory device. It is contemplated that the processor for the controller 73 may be a single processor or multiple processors operating in tandem. It is further contemplated that the processor for the controller 73 may be implemented in part or in whole on a field programmable gate array (FPGA), an application specific integrated circuit (ASIC), a logic circuit, or a combination thereof. The memory device for the controller 73 may be a single electronic device, or multiple electronic devices, including static memory, dynamic memory, transitory memory, non-transitory memory, or a combination thereof. The memory device for the controller preferably stores parameters for operation of the elevator 10 and one or more programs, which include instructions executable on the processor for the controller 73.

Figure 3:
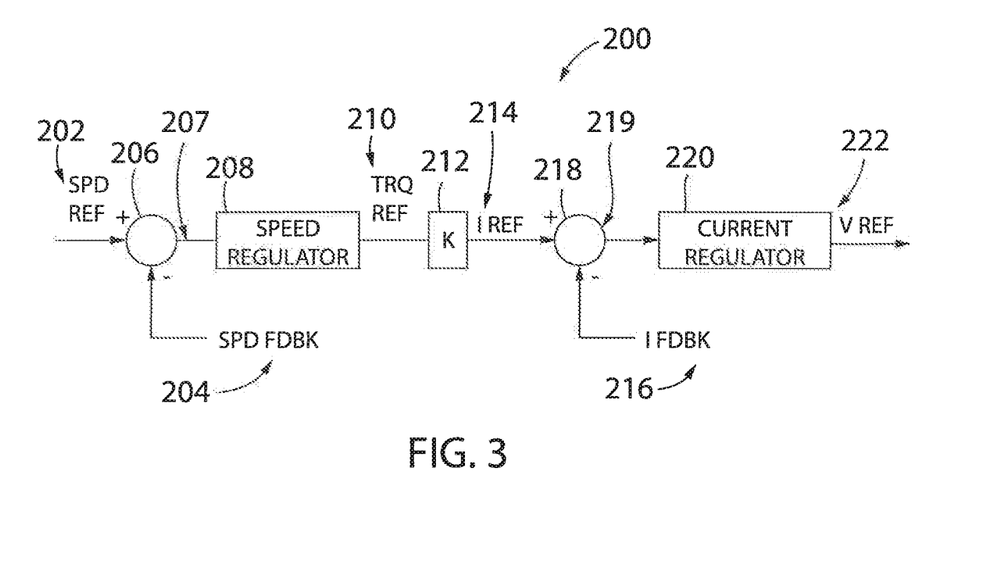
FIG. 3 is a block diagram representation of an exemplary control module executed by the motor controller of FIG. 2.

In operation, the processor 50 receives a command signal 47, indicating a desired operation of the corresponding motor 70 in the elevator system 10, and provides a variable amplitude and frequency output voltage to the motor 70 responsive to the command signal 47. The command signal 47 is received by the processor 50 and converted, for example, from discrete digital signals or an analog signal to an appropriately scaled speed reference 202 for use by a control module 200 within the motor controller 40 (see also FIG. 3). The position feedback device 80 provides the position feedback signal 95 to the processor 50. The position feedback signal 95 is converted to a speed feedback signal 204 as will be discussed in more detail below. The speed reference 202 and a speed feedback signal 204 enter a summing junction 206, resulting in a speed error signal 207. The speed error signal 207 is provided as an input to a speed regulator 208. The speed regulator 208, in turn, determines a required torque reference 210 to minimize the speed error signal 207, thereby causing the motor 70 to run at the desired speed reference 202. A scaling factor 212 converts the torque reference 210 to a desired current reference 214. The current reference 214 and a current feedback signal 216, derived from a feedback signal generated by a current sensor 136 measuring the current present at the output of the motor drive 40, enter a second summing junction 218, resulting in a current error signal 219. The current error signal is provided as an input to the current regulator 220. The current regulator 220 generates the voltage reference 222 which will minimize the error signal 219, again causing the motor 70 to run at the desired speed reference 202. This voltage reference 222 is used to generate the switching signals 62 which control the inverter section 46 to produce a variable amplitude and frequency output voltage to the motor 70.

Figure 4:
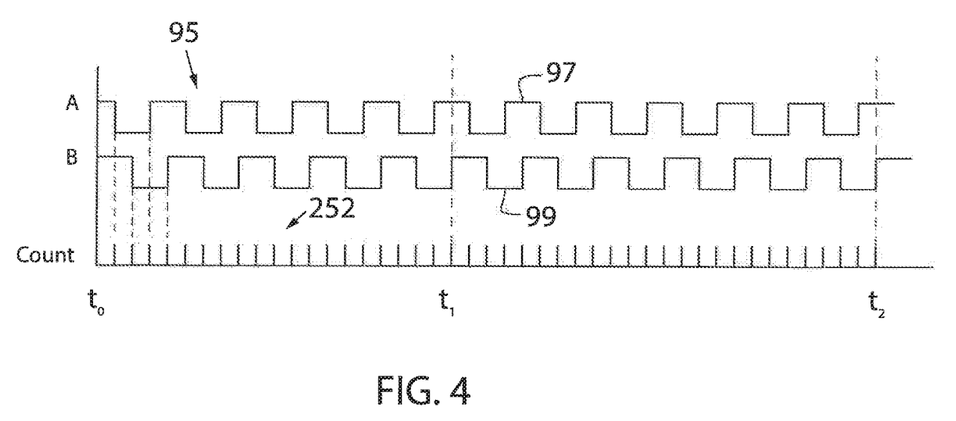
FIG. 4 is a graphical representation of an encoder feedback signal and a number of counts determined from the encoder feedback signal at a first motor speed.
Figure 5:
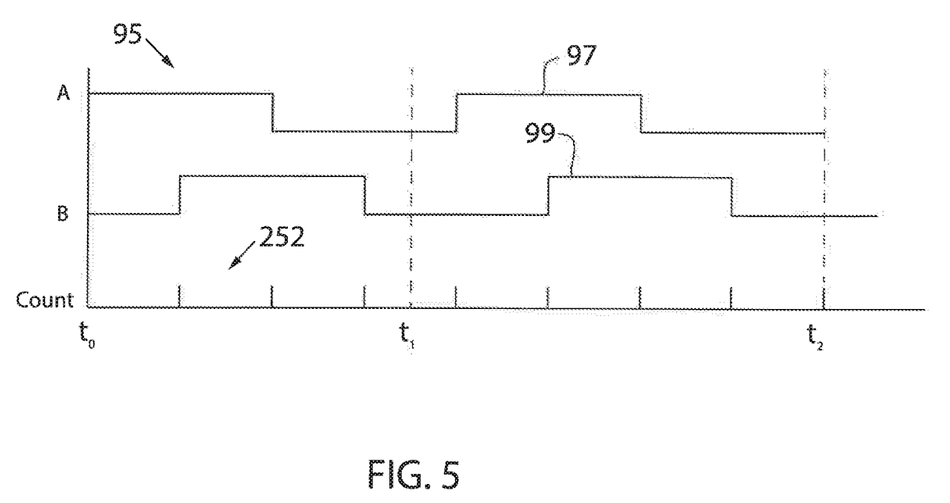
FIG. 5 is a graphical representation of an encoder feedback signal and a number of counts determined from the encoder feedback signal at a second motor speed.

With reference next to FIGS. 4 and 5, an exemplary position feedback signal 95 is illustrated. According to the illustrated embodiment, the exemplary position feedback signal 95 includes an A-channel 97 and a B-channel 99, where the B-channel is shifted in phase from the A-channel by ninety degrees. The A and B channels are commonly referred to as quadrature signals, and the direction of rotation of the motor 70 can be determined by monitoring which channel is leading the other channel. When the motor 70 is rotating in one direction, the A-channel 97 will lead the B-channel 99, and when the motor 70 is rotating in the other direction, the B-channel 99 will lead the A-channel 97. Each cycle, including a logical high segment and a logical low segment, is considered a single pulse from the position feedback device 80. As previously indicated, position feedback devices 80 are configured to generated a number of pulses per revolution of the position feedback device 80. The number of pulses per revolution (ppr) may be, for example, 1024, 2048, 4096, or the like. Because each position feedback device 80 is commonly coupled directly to the rotor of the motor 70, the number of ppr defined for the position feedback device 80 is typically the same ppr generated for each rotation of the motor 70. For purposes of discussion herein, it will be assumed that the encoder 80 is directly coupled to the rotor of the motor 70 and ppr of the encoder or ppr of the motor may be used interchangeably.

The illustrated position feedback signal 95 is intended to be exemplary only and is not limiting. It is understood that other forms of position feedback signals 95 may be utilized without deviating from the scope of the invention. The position feedback signal 95 may include, for example, differential signals, including an inverted A-channel and an inverted B-channel. Optionally, the position feedback signal 95 may include a sinusoidal waveform or a pair of sinusoidal waveforms, where one sinusoidal waveform is shifted in phase by ninety degrees from the second sinusoidal waveform. According to still another option, the position feedback signal 95 may be included as data in a data packet transmitted from the encoder via any standard or industrial protocol for data communications.

FIGS. 4 and 5 illustrate two different velocities for the motor 70. In FIG. 4, the motor generates five pulses per sample period, while in FIG. 5, the motor generates less than one pulse per sample period. Within FIGS. 4 and 5, the sample period is the duration of time between time indications along the x-axis. The duration of time between $t_0$ and $t_1$ is a first sample period, and the duration of time between $t_1$ and $t_2$ is a second sample period. The duration of the sample periods illustrated in FIGS. 4 and 5 are considered to be the same. Because the rate at which the A-channel and B-channel change in FIG. 4 is faster than the rate at which they change in FIG. 5, FIG. 4 indicates the motor 70 is rotating at a faster speed to generate the illustrated position feedback signal 95 than the speed required to generate the position feedback signal 95 shown in FIG. 5.

Also illustrated in FIGS. 4 and 5, is an additional signal 252 labelled as counts. As may be observed from FIGS. 4 and 5, a count is generated at each transition from high-to-low or from low-to-high for each channel 97, 99 of the position feedback signal 95. Monitoring each edge transition allows for an initial increase in the resolution of the position feedback signal 95. As illustrated, there are four counts 252 for each pulse of the position feedback signal 95. A first count is generated at the transition from high-to-low of the A channel 97, and a second count is generated at the transition from high-to-low of the B channel 99. A third count is generated at the transition from low-to-high of the A channel 97, and a fourth count is generated at the transition from low-to-high of the B channel 99. The feedback resolution per sample period in FIG. 4 is increased from five pulses per sample period to twenty counts per sample period. The feedback resolution is also increased in FIG. 5. However, it is noted that in the first sample period, the resolution is increased from one pulse to three counts, and in the second sample period, the resolution is increased from one pulse to four counts. This results in a twenty-five percent variation in the speed feedback during consecutive sample periods. The speed regulator 208 would attempt to maintain a constant speed creating a torque ripple at the motor 70 as the speed regulator 208 repeatedly slows down and speeds up the motor.

The motor drive 40 includes a feedback circuit configured to receive the position feedback signal 95. It is contemplated that the feedback circuit may include buffers, discrete logic circuits, or even a dedicated processor to perform some initial processing on the position feedback signal 95 prior to passing the feedback signal to the processor 50. The feedback circuit may be a daughter board that is inserted into the motor drive 40 according to the type of feedback signal 95 being utilized. The feedback circuit may, for example, be configured to receive the quadrature pulses illustrated in FIG. 4, sinusoidal waveforms, or a serial communication protocol. According to one embodiment of the invention, the feedback circuit is configured to convert the position feedback signal 95 to counts 252. According to another embodiment of the invention, the processor 50 may convert the position feedback signal to counts 252.

Figure 6:
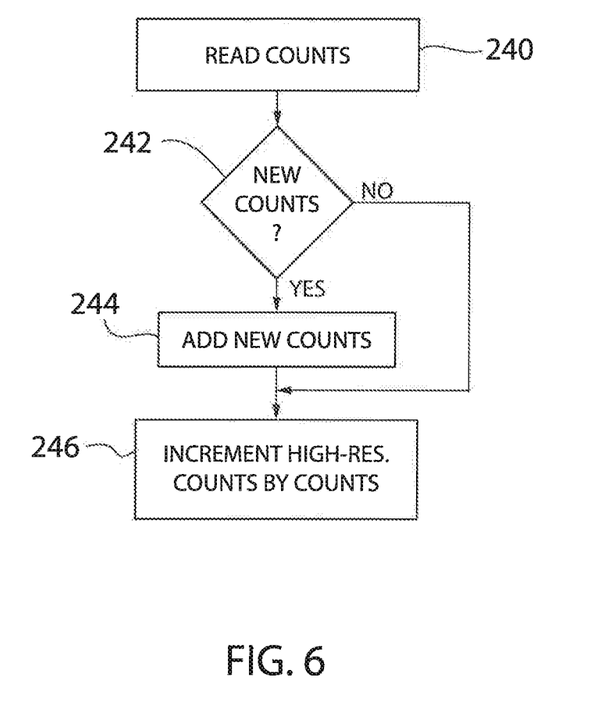
FIG. 6 is a flow diagram illustrating steps for increasing resolution of the encoder feedback signal according to one embodiment of the invention.

The present invention provides still further improvement on the resolution of the feedback signal. Turning next to FIG. 6, the steps for increasing resolution are illustrated. At step 240, the processor 50 reads the value of counts 250 from memory 52. The processor 50 then checks to see if new counts from the position feedback signal 95 have been detected, as illustrated in step 242. If new counts have been detected, the number of new counts detected is added to the value of counts 250 previously read from memory 52 and the new value of counts is stored in memory as shown in step 244. If no new counts were detected at step 242, the processor 50 skips down to step 246. At step 246, the processor 50 adds the value of counts 250 to the high-resolution counts register 260.

The steps illustrated in FIG. 6 are configured to execute at a periodic interval that is greater than the periodic interval at which the speed regulator 208 executes. With reference again to FIG. 3, the control module 200 includes a speed regulator 208 and a current regulator 220. The illustrated control module 200 is intended to be exemplary and not limiting and it is understood that various other control loops may be included, such as feed-forward paths, additional cascaded control loops, observers, and the like. The two illustrated regulators, however, are fundamental components and are typically configured to execute at two different periodic intervals. The speed regulator 208, as the first control loop in the cascaded control structure, executes at a slower periodic interval than the current regulator 220, as the second control loop in the cascaded control structure. In this manner, the current regulator 220 is able to respond to changes to the current reference signal 214 and to regulate the voltage output to the motor 70 to maintain operation of the motor at the current reference. According to an exemplary embodiment, the speed regulator 208 may be configured to operate at a two millisecond (2 ms) interval. The current regulator 220 may be configured to operate at a user selectable interval ranging from about fifty microseconds (50 μs) to about two hundred microseconds (200 μs). This allows the processor 50 to execute the instructions for the current regulator 220 between about ten and forty times for each time the processor executes the instructions for the speed regulator 208. According to one embodiment of the invention, the steps illustrated in FIG. 6 may be performed by the processor 50 within the periodic interval for the current regulator 220. Optionally, a separate periodic interval may be established during which the processor 50 executes the steps of FIG. 6. In either embodiment, the steps illustrated in FIG. 6 are performed multiple times for each execution of the speed regulator 208.

Figure 7A:
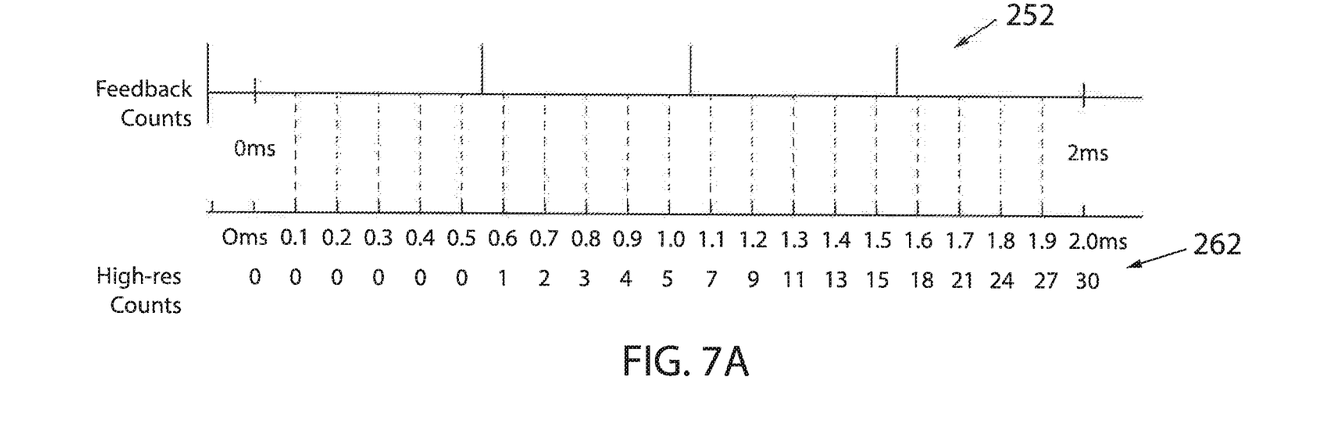
FIG. 7A is a graphical representation of converting counts to high-resolution counts at a first motor speed.
Figure 7B:
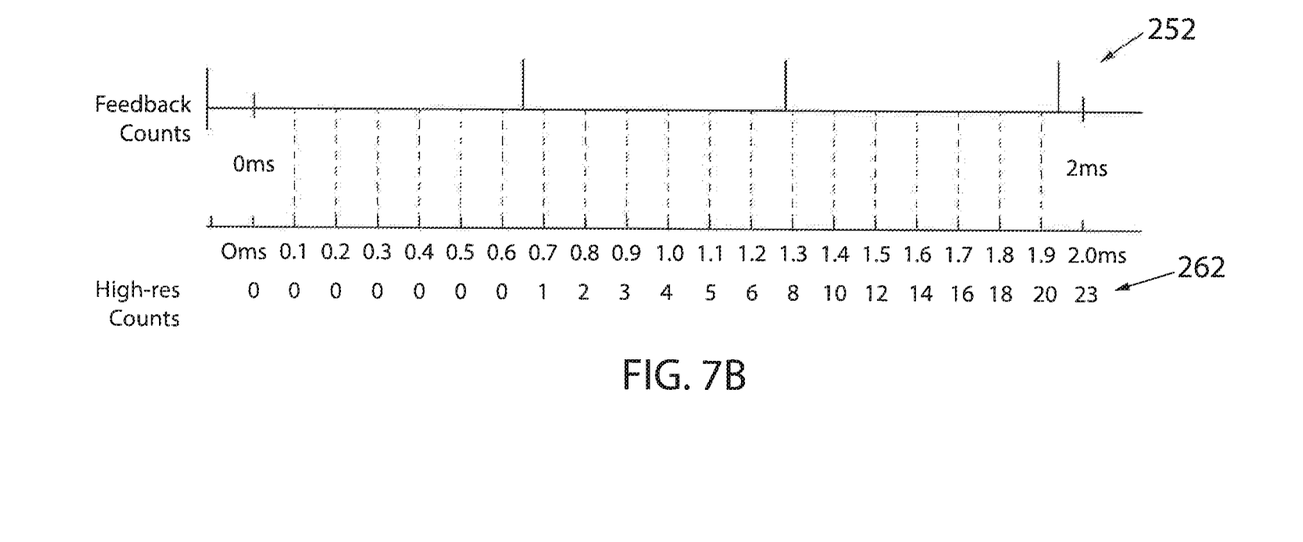
FIG. 7B is a graphical representation of converting counts to high-resolution counts at a second motor speed.

With reference next to FIGS. 7A and 7B, exemplary operation of the present invention is illustrated for two different slow speed operations of the motor 70. In the illustrated embodiment, the speed regulator 208 is configured to execute at a two millisecond (2 ms) interval. Thus, the speed regulator 208 executes once at the start of the time shown in each plot and will execute a second time after the 2 ms time stamp shown. The current regulator 220 is configured to execute at one hundred microsecond (100 µs) intervals which may also be referred to as a ten kilohertz (10 kHz) frequency. The instructions for increasing resolution of the speed feedback signal 95 are performed during the periodic interval for the current regulator and, therefore, occur twenty times for each execution of the speed regulator.

While both FIG. 7A and FIG. 7B illustrate operation of the motor 70 at a speed for which three counts 252 are detected within the first periodic interval of 2 ms, it is evident that the motor 70 is rotating at different velocities in each figure. In FIG. 7A, the fourth count will occur almost immediately after the end of the first periodic interval, and in FIG. 7B, the third count occurs just before the end of the first periodic interval, such that the fourth count would occur at some instance into the next 2 ms periodic interval. The values of the high-resolution counts 262 illustrate this difference in speed of the motor 70.

In FIG. 7A, the first count 252 is detected just after five hundred microseconds. For the first five intervals of the 100 µs periodic interval, the number of counts 252 detected is zero. Therefore, at step 244 in FIG. 6, zero is being added to the high-resolution counter 260. After detecting the first count 252, the processor 50 begins incrementing the high-resolution counter 260 by one count. The values 262 of the high-resolution counter are shown being incremented by one. The second count 252 is detected between one millisecond and one and one tenth of a millisecond, or during the tenth 100 µs periodic interval. With the detection of a new count, the processor begins incrementing the values 262 of the high-resolution counter 260 by two. Similarly, the third count 252 is detected between one and five-tenths of a millisecond and one and six-tenths of a millisecond, or during the fifteenth 100 µs periodic interval, and the processor begins incrementing the values 262 of the high-resolution counter 260 by three. At the end of the 2 ms interval, the high-resolution counter 260 has thirty high-resolution counts 262.

In FIG. 7B, the first count 252 is detected just after six hundred microseconds. For the first six intervals of the 100 s periodic interval, the number of counts 252 detected is zero. Therefore, at step 244 in FIG. 6, zero is being added to the high-resolution counter 260. After detecting the first count 252, the processor 50 begins incrementing the high-resolution counter 260 by one count. The values 262 of the high-resolution counter are shown being incremented by one. The second count 252 is detected between one and two-tenths of a millisecond and one and three-tenths of a millisecond, or during the twelfth 100 µs periodic interval. With the detection of a new count, the processor begins incrementing the values 262 of the high-resolution counter 260 by two. Similarly, the third count 252 is detected between one and nine-tenths of a millisecond and two milliseconds, or during the nineteenth 100 s periodic interval, and the processor begins incrementing the values 262 of the high-resolution counter 260 by three. At the end of the 2 ms interval, the high-resolution counter 260 has twenty-three high-resolution counts 262. Thus, while the number of counts 252 would indicate that the motor is operating at an identical speed, the number of high-resolution counts 262 is able to differentiate in the velocity of the motor 70 between FIG. 7A and FIG. 7B.

The speed regulator 208 is then able to utilize the high-resolution counts 262 to determine speed feedback 204. The number of high-resolution counts 262 per two-millisecond interval may be converted to an angular velocity of the motor 70. This speed feedback 204 signal is compared to the speed reference 202 to determine the speed error 207 as discussed above. Within the two-millisecond interval, the processor 50 may be configured to reset the value 262 of the high-resolution counter 260 such that it starts at zero for the next series of 100 µs periodic interval. Optionally, the processor 50 may store the present value 262 of the high-resolution counter 260 and compare a difference in values 262 between two consecutive 2 ms periodic intervals to determine the number of high-resolution counts 262 which occurred during each 2 ms periodic interval.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for increasing resolution of a position feedback signal to a motor drive, the method comprising the steps of:
   receiving a position feedback signal at an input to the motor drive;
   sampling the position feedback signal at a first time interval;
   incrementing a pulse counter within the motor drive during the first time interval when a new pulse from the position feedback signal is detected;
   reading a high resolution pulse count register from a high resolution pulse counter during each of the first time intervals;
   adding a value of the pulse counter to the high resolution pulse count register during each of the first time intervals to obtain a new value for the high resolution pulse count register;
   storing the new value in the high resolution pulse count register during each of the first time intervals; and
   executing a speed regulator with a processor in the motor drive during a second time interval, wherein:
   the speed regulator uses the high resolution pulse count register, and
   the second time interval is longer than the first time interval.

2. The method of claim 1 wherein the step of executing the speed regulator further comprises the steps of:
   receiving a speed reference;

converting the high resolution pulse count register to a speed feedback signal; and
determining a speed error as a difference between the speed reference and the speed feedback signal.

3. The method of claim 1 further comprising the step of resetting the high resolution pulse count register during each second time interval.

4. The method of claim 1 further comprising the steps of:
storing a present value of the high resolution pulse count register in a memory of the motor drive during each second time interval;
comparing the present value of the high resolution pulse count register to a stored value from an immediately prior second time interval to determine a number of high resolution pulses between consecutive second time intervals; and
using the number of high resolution pulses between the consecutive second time intervals in the speed regulator.

5. The method of claim 1 wherein the steps performed during the first time interval execute at least ten times between performing the steps during the second time interval.

6. The method of claim 1 further comprising the step of converting pulses from the position feedback signal to counts, wherein:
the step of sampling the position feedback signal comprises sampling a number of counts received; and
the step of incrementing the pulse counter occurs when a new count from the position feedback signal is detected.

7. A motor drive configured to increase resolution of a position feedback signal, the motor drive comprising:
an input configured to receive a position feedback signal; and
a processor configured to execute a first series of instructions at a first time interval and to execute a second series of instructions at a second time interval, wherein:
the first time interval is shorter than the second time interval,
the first series of instructions execute to:
increment a first counter when a new pulse from the position feedback signal is detected,
read a high resolution counter register from a high resolution counter during each first time interval,
add a value of the first counter to the high resolution counter register to obtain a new value for the high resolution counter register during each first time interval, and
store the new value in the high resolution counter register during each of the first time intervals,
the second series of instructions executes a speed regulator using the high resolution counter during each second time interval.

8. The motor drive of claim 7 wherein the processor is further configured to execute the second series of instructions to:
convert the high resolution counter register to a speed feedback signal; and
determine a speed error as a difference between a speed reference and the speed feedback signal.

9. The motor drive of claim 7 wherein the processor is further configured to execute the second series of instructions to reset the high resolution counter register during each second time interval.

10. The motor drive of claim 7 wherein the processor is further configured to execute the second series of instructions to:
store a present value of the high resolution counter register in a memory of the motor drive during each second time interval;
compare the present value of the high resolution counter register to a stored value from an immediately prior second time interval to determine a number of high resolution pulses between consecutive second time intervals; and
use the number of high resolution pulses between the consecutive second time intervals in the speed regulator.

11. The motor drive of claim 7 wherein the first series of instructions in the first time interval execute at least ten times during the second time interval.

12. The motor drive of claim 7 wherein:
the motor drive is configured to convert pulses from the position feedback signal to counts; and
the processor is further configured to execute the first series of instructions to increment the first counter when a new count from the position feedback signal is detected.

13. A method for increasing resolution of a position feedback signal to a motor drive, the method comprising the steps of:
receiving a position feedback signal at an input to the motor drive;
determining a number of counts in the motor drive as a function of the position feedback signal;
monitoring the number of counts at a first time interval;
incrementing a first counter within the motor drive during the first time interval when a new count is detected;
reading a high resolution counter register from a high resolution counter during each of the first time intervals;
adding a value of the first counter to the high resolution counter register to obtain a new value for the high resolution counter register during each of the first time intervals;
storing the new value in the high resolution counter register during each of the first time intervals; and
executing a speed regulator in the motor drive during a second time interval, wherein:
the speed regulator uses the high resolution counter, and
the second time interval is longer than the first time interval.

14. The method of claim 13 wherein the motor drive includes a feedback circuit configured to receive the position feedback signal and to determine the number of counts.

15. The method of claim 13 wherein the motor drive includes a feedback circuit configured to receive the position feedback signal and a processor configured to determine the number of counts.

16. The method of claim 13 wherein the step of executing the speed regulator further comprises the steps of:
receiving a speed reference;
converting the high resolution counter register to a speed feedback signal; and
determining a speed error as a difference between the speed reference and the speed feedback signal.

17. The method of claim 13 further comprising the step of resetting the first counter during the second time interval.

18. The method of claim 13 further comprising the step of resetting the high resolution counter register during each second time interval.

19. The method of claim 13 further comprising the steps of:
- storing a present value of the high resolution counter register in a memory of the motor drive during each second time interval;
- comparing the present value of the high resolution counter register to a stored value from an immediately prior second time interval to determine a number of high resolution counts between consecutive second time intervals; and
- using the number of high resolution counts between the consecutive second time intervals in the speed regulator.

20. The method of claim 13 wherein the steps performed during the first time interval execute at least ten times between performing the steps during the second time interval.

* * * * *